United States Patent
Kim

(10) Patent No.: US 6,952,749 B2
(45) Date of Patent: Oct. 4, 2005

(54) MULTIPROCESSOR INTERRUPT HANDLING SYSTEM AND METHOD

(75) Inventor: Jason Seung-Min Kim, San Jose, CA (US)

(73) Assignee: PortalPlayer, Inc., Santa Clara, CA (US)

( * ) Notice: Subject to any disclaimer, the term of this patent is extended or adjusted under 35 U.S.C. 154(b) by 603 days.

(21) Appl. No.: 09/849,885

(22) Filed: May 2, 2001

(65) Prior Publication Data

US 2002/0166018 A1 Nov. 7, 2002

(51) Int. Cl.$^7$ .............................................. G06F 13/24
(52) U.S. Cl. .......................... 710/260; 710/269; 710/48
(58) Field of Search ........................... 710/48, 260–289

(56) References Cited

U.S. PATENT DOCUMENTS

| | | | | |
|---|---|---|---|---|
| 4,449,183 A | * | 5/1984 | Flahive et al. | ............... 711/151 |
| 5,265,215 A | * | 11/1993 | Fukuda et al. | ............... 710/123 |
| 5,297,290 A | * | 3/1994 | Masui et al. | ................ 710/267 |
| 5,590,380 A | * | 12/1996 | Yamada et al. | ............... 710/48 |
| 6,070,221 A | * | 5/2000 | Nakamura | ................... 710/264 |

* cited by examiner

*Primary Examiner*—Tim Vo
(74) *Attorney, Agent, or Firm*—Raymond E. Roberts; Intellectual Property Law Offices

(57) ABSTRACT

An interrupt handling system and method for a multiple processor system permit the interrupts generated by one or more hardware devices to be routed and prioritized dynamically. In particular, the interrupt controller permits the interrupts to be dynamically routed between the multiple processors and permits a particular interrupt to be dynamically assigned a priority level. The interrupt handling system also permits software based interrupts wherein, for example, one processor may interrupt another processor.

38 Claims, 11 Drawing Sheets

FUNCTIONAL BLOCK DIAGRAM OF INTERRUPT CONTROLLER

| Offset | Register | Description |
|---|---|---|
| 0 | ISR | Interrupt Status Register |
| 4 | IER | Interrupt Enable Register |
| 8 | IER_set | Each bit written as one will set the corresponding bit in IER |
| C | IER_clr | Each bit written as one will clr the corresponding bit in IER |
| 10 | FIR | Force Interrupt Register |
| 14 | FIR_set | Each bit written as one will set the corresponding bit in FIR |
| 18 | FIR_clr | Each bit written as one will clr the corresponding bit in FIR |
| 1C | IMX | Interrupt Mux Register ('1'/'0' Routes interrupt to nFIQ/nIRQ |
| 20 | IMX_set | Each bit written as one will set the corresponding bit in IMX |
| 24 | IMX_clr | Each bit written as one will clr the corresponding bit in IMX |
| 28 | VIR | Read only Valid Interrupt Register for nIRQ |
| 2C | FVIR | Read only Fast Valid Interrupt Register for nFIQ |

FIG. 7

| Bit | Description |
|---|---|
| 0 | USB |
| 1 | UART A |
| 2 | UART B |
| 3 | External |
| 4 | USB Fast |
| 5 | Not Defined (CIF) |
| 6 | Not Defined |
| 7 | Not Defined (Keyboard) |
| 8 | EIDE 1 |
| 9 | EIDE 2 |
| A | Not Defined |
| B | Not Defined |
| C | Not Defined |
| D | Timer 2 |
| E | Timer 1 |
| F | Not defined |
| 10 | USB Reset |
| 11 | AC |
| 12 | Timer 1 |
| 13 | Timer 2 |
| 31:14 | Not Defined |

FIG. 8

| INTERRUPT CONTROLLER | | | | |
|---|---|---|---|---|
| VIRQ_CPU | CF00:1000 | RO | 32B | VALID INTERRUPT STATUS FOR CPU (PRIMARY) | 00000000 |
| VIRQ_COP | CF00:1004 | RO | 32B | VALID INTERRUPT STATUS FOR COP (SECONDARY) | 00000000 |
| VFIQ_CPU | CF00:1008 | RO | 32B | FIQ VALID INTERRUPT STATUS FOR CPU (PRIMARY) | 00000000 |
| VFIQ_COP | CF00:100C | RO | 32B | FIQ VALID INTERRUPT STATUS FOR COP (SECONDARY) | 00000000 |
| ISR (READ-ONLY) | CF00:1010 | RO | 32B | LATCHED INTERRUPT STATUS REGISTER (HW) | 00000000 |
| FIR (READ-ONLY) | CF00:1014 | RO | 32B | FORCED INTERRUPT STATUS REGISTER (SW) | 00000000 |
| FIR_SET | CF00:1018 | SET | 32B | FORCE INTERRUPT REGISTER SET | 00000000 |
| FIR_CLR | CF00:101C | CLR | 32B | FORCE INTERRUPT REGISTER CLEAR | 00000000 |
| CPU_IER (READ-ONLY) | CF00:1020 | RO | 32B | ENABLED INTERRUPT SOURCE FOR CPU | 00000000 |
| CPU_IER_SET | CF00:1024 | SET | 32B | SET INTERRUPT SOURCE FOR CPU | 00000000 |
| CPU_IER_CLR | CF00:1028 | CLR | 32B | CLEAR INTERRUPT SOURCE FOR CPU | 00000000 |
| CPU_IEP_CLASS | CF00:102C | RW | 32B | CPU'S INTERRUPT ENABLE PRIORITY CLASS (FIQ/IRQ) | 00000000 |
| COP_IER (READ-ONLY) | CF00:1030 | RO | 32B | ENABLED INTERRUPT SOURCE FOR COP | 00000000 |
| COP_IER_SET | CF00:1034 | SET | 32B | SET INTERRUPT SOURCE FOR COP | 00000000 |
| COP_IER_CLR | CF00:1038 | CLR | 32B | CLEAR INTERRUPT SOURCE FOR COP | 00000000 |
| COP_IEP_CLASS | CF00:103C | RW | 32B | COP'S INTERRUPT ENABLE PRIORITY CLASS (FIQ/IRQ) | 00000000 |
| DMA_STATUS | CF00:1040 | RO | 32B | DMA INTERRUPT SOURCE STATUS | 00000000 |

FIG. 9A

| IRQ16 | IRQ17 | IRQ18 | IRQ19 | IRQ20 | IRQ21 | IRQ22 | IRQ23 | IRQ24 | IRQ25 | IRQ26 | IRQ27 | IRQ28 | IRQ29 | IRQ30 | IRQ31 |
|---|---|---|---|---|---|---|---|---|---|---|---|---|---|---|---|
| IRQ16 | IRQ17 | IRQ18 | IRQ19 | IRQ20 | IRQ21 | IRQ22 | IRQ23 | IRQ24 | IRQ25 | IRQ26 | IRQ27 | IRQ28 | IRQ29 | IRQ30 | IRQ31 |
| FIQ16 | FIQ17 | FIQ18 | FIQ19 | FIQ20 | FIQ21 | FIQ22 | FIQ23 | FIQ24 | FIQ25 | FIQ26 | FIQ27 | FIQ28 | FIQ29 | FIQ30 | FIQ31 |
| FIQ16 | FIQ17 | FIQ18 | FIQ19 | FIQ20 | FIQ21 | FIQ22 | FIQ23 | FIQ24 | FIQ25 | FIQ26 | FIQ27 | FIQ28 | FIQ29 | FIQ30 | FIQ31 |
| ISR16 | ISR17 | ISR18 | ISR19 | ISR20 | ISR21 | ISR22 | ISR23 | ISR24 | ISR25 | ISR26 | ISR27 | ISR28 | ISR29 | ISR30 | ISR31 |
| FIR16 | FIR17 | FIR18 | FIR19 | FIR20 | FIR21 | FIR22 | FIR23 | IFIR24 | FIR25 | FIR26 | FIR27 | FIR28 | FIR29 | FIR30 | FIR31 |
| | | | | | | | | | | | | | | | |
| IER16 | IER17 | IER18 | IER19 | IER20 | IER21 | IER22 | IER23 | IER24 | IER25 | IER26 | IER27 | IER28 | IER29 | IER30 | IER31 |
| | | | | | | | | | | | | | | | |
| IER16 | IER17 | IER18 | IER19 | IER20 | IER21 | IER22 | IER23 | IER24 | IER25 | IER26 | IER27 | IER28 | IER29 | IER30 | IER31 |

FIG. 9B

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| IRQ15 | IRQ14 | IRQ13 | IRQ12 | IRQ11 | IRQ10 | IRQ9 | IRQ8 | IRQ7 | IRQ6 | IRQ5 | IRQ4 | IRQ3 | IRQ2 | IRQ1 | IRQ0 | |
| IRQ15 | IRQ14 | IRQ13 | IRQ12 | IRQ11 | IRQ10 | IRQ9 | IRQ8 | IRQ7 | IRQ6 | IRQ5 | IRQ4 | IRQ3 | IRQ2 | IRQ1 | IRQ0 | |
| FIQ15 | FIQ14 | FIQ13 | FIQ12 | FIQ11 | FIQ10 | FIQ9 | FIQ8 | FIQ7 | FIQ6 | FIQ5 | FIQ4 | FIQ3 | FIQ2 | FIQ1 | FIQ0 | |
| FIQ15 | FIQ14 | FIQ13 | FIQ12 | FIQ11 | FIQ10 | FIQ9 | FIQ8 | FIQ7 | FIQ6 | FIQ5 | FIQ4 | FIQ3 | FIQ2 | FIQ1 | FIQ0 | |
| ISR15 | ISR14 | ISR13 | ISR12 | ISR11 | ISR10 | ISR9 | ISR8 | ISR7 | ISR6 | ISR5 | ISR4 | ISR3 | ISR2 | ISR1 | ISR0 | |
| FIR15 | FIR14 | FIR13 | FIR12 | FIR11 | FIR10 | FIR9 | FIR8 | FIR7 | FIR6 | FIR5 | FIR4 | FIR3 | FIR2 | FIR1 | FIR0 | FIR_SET (SET FORCED INTERRUPT BIT) |
|  |  |  |  |  |  |  |  |  |  |  |  |  |  |  |  | FIR_CLR (CLEAR FORCED INTERRUPT BIT) |
| IER15 | IER14 | IER13 | IER12 | IER11 | IER10 | IER9 | IER8 | IER7 | IER6 | IER5 | IER4 | IER3 | IER2 | IER1 | IER0 | CPU_IER_SET (ENABLE INTERRUPT SOURCE FOR CPU) |
|  |  |  |  |  |  |  |  |  |  |  |  |  |  |  |  | CPU_IER_CLR (DISABLE INTERRUPT SOURCE FOR CPU) |
|  |  |  |  |  |  |  |  |  |  |  |  |  |  |  |  | CPU-IEP_CLASS (SET PRIORITY INTERRUPT SOURCE FOR CPU) |
| IER15 | IER14 | IER13 | IER12 | IER11 | IER10 | IER9 | IER8 | IER7 | IER6 | IER5 | IER4 | IER3 | IER2 | IER1 | IER0 | COP_IER_SET (ENABLE INTERRUPT SOURCE FOR COP) |
|  |  |  |  |  |  |  |  |  |  |  |  |  |  |  |  | COP_IER_CLR (DISABLE INTERRUPT SOURCE FOR COP) |
|  |  |  |  |  |  |  |  |  |  |  |  |  |  |  |  | COP_IEP_CLASS (SET PRIORITY INTERRUPT SOURCE FOR COP) |
|  |  |  |  |  |  |  |  |  |  |  |  |  |  |  |  | DMA_SOURCE_STATUS |

FIG. 9C

MULTIPROCESSOR INTERRUPT HANDLING SYSTEM AND METHOD

FIELD OF THE INVENTION

This invention relates generally to an interrupt controller for a computer system and in particular to an interrupt handling system for a multiple processor system.

BACKGROUND OF THE INVENTION

All modern computer systems have a mechanism for managing the communication of data between the one or more electrical units/components of the computer system. For example, a computer system may include a processor that executes a plurality of instructions in order to perform a function, a memory for storing the instructions currently being executed by the processor as well as data that is acted on by the instructions, a persistent storage device for storing one or more different software programs (each comprising one or more instructions executed by the processor) even when the computer system is powered down and one or more peripheral devices. The peripheral devices may include input/output devices such as a keyboard, a mouse, a printer and other interface controllers to input/output ports. During the normal operation of the computer system, data has to be communicated between the input/output devices or ports and the processor. To alert the processor to the fact that a particular peripheral device has data to communicate, an interrupt signal may be generated by the particular peripheral device. Typically, there may be some interrupt signals that are permanently assigned to a particular peripheral device while other interrupt signals are assigned on a dynamic basis. For example, a keyboard is typically permanently assigned the first interrupt signal (IRQ0) while a universal serial bus (USB) port may be assigned whatever interrupt signal is available when the USB port needs to alert the processor that it needs to communicate data.

In a typical computer system, the interrupt signal generated by a peripheral device is fed to the processor. The processor may, based on the information in the interrupt signal, be directed to a particular interrupt handling/service routine that is stored in the memory of the computer system. Typically, for each different peripheral device or port, there may be a separate interrupt handling routine. The processor may then execute the instructions in the particular interrupt handling routine in order to handle the data communications with the particular peripheral device. This is how the interrupt handling for a typical single processor computer systems works.

The problem with this single processor interrupt handling technique is that it cannot be effectively used for a multiple processor system. In particular, when there are two or more processors in the computer system, the above described interrupt handling system is ineffective for a variety of reasons. First, when there are one or more processors, it is possible that the interrupt handling routine can be handled by either of the processors or the tasks in the interrupt handling routine can be split between the two or more processors. In addition, if one processor is too busy when it receives an interrupt, the interrupt can be redirected to the other processor that has more processing capacity at the particular time that the interrupt has occurred. A typical single processor interrupt handling system cannot effectively handle the interrupt handling process due to the differences that exist between a single processor computer system and a multiple processor computer system. Thus, it is desirable to provide a multiple processor interrupt handling system and method and it is to this end that the present invention is directed.

SUMMARY OF THE INVENTION

The interrupt handling system for a multiprocessor system in accordance with the invention overcomes the above limitations and problems with a conventional interrupt handling system. The system permits the interrupts, which may be hardware device based or software based, to be routed to one or more of the processors dynamically based on the availability of the processors. The system also permits a priority to be assigned to an interrupt signal on a dynamic basis. In a preferred embodiment, there may be two processors and two different priority levels.

The interrupt handling system may include an interrupt controller that handles the routing of the interrupt signals and the priority assignment for each interrupt signal. The interrupt handler may have one or more flip-flops and one or more logic gates. The interrupt controller is dynamically controlled by programming one or more registers. The system permits an interrupt to be assigned to a particular processor based on which processor has more availability. The system may also permit an interrupt handling routing to be split between the two processors.

Thus, in accordance with the invention, a computer system having an interrupt handling apparatus is provided. The computer system comprises one or more processors and one or more hardware devices that are capable of interrupting the one or more processors using an interrupt signal. An interrupt controller is provided that is capable of handling the interrupts from the one or more hardware devices and capable of independently generating a low priority interrupt signal and a high priority interrupt signal for each processor. The interrupt controller further comprises an enable device that is capable of enabling the interrupt signal independently for each processor and a priority device that is capable of assigning a priority to each interrupt signal destined for any processor wherein a particular interrupt signal is capable of being routed to either or both processors and is capable of being assigned a low priority or a high priority.

In accordance with another aspect of the invention, a method for interrupt handling in a multiple processor system is provided. The method comprises assigning the interrupt signal to one of the multiple processors based on availability of each processor, assigning a priority level to the interrupt signal wherein the priority is selected from one or more different priorities, and routing the interrupt signal with the assigned priority level to the assigned processor. In accordance with yet another aspect of the invention, a method for interrupt handling in a multiple processor system is provided wherein the method comprises assigning the interrupt signal to one of the multiple processors based on availability of each processor, and assigning a priority level to the interrupt signal wherein the priority is selected from one or more different priorities.

In accordance with yet another aspect of the invention, a computer system is provided wherein the computer system includes a first processor, a second processor and a peripheral controller having a first bus that is capable of connecting the first processor to a set of peripheral resources and a second bus that is capable of connecting the second processor to the same set of peripheral resources wherein each peripheral in the set of peripheral resources is capable of generating an interrupt signal. The peripheral controller further comprises an interrupt controller that is capable of handling the interrupts from the set of peripheral resources and software interrupts and capable of independently generating a low priority interrupt signal and a high priority interrupt signal for each processor from the peripheral and software interrupts. The interrupt controller further comprises a first processor enable device that is capable of enabling the interrupt signals for the first processor, a second processor enable device that is capable of enabling the interrupt signals for the second processor, a first processor priority device that is capable of assigning a priority to the interrupt signals for the first processor and a second processor priority device that is capable of assigning a priority to the interrupt signals for the second processor wherein a particular interrupt signal is capable of being routed to either processor and is capable of being assigned a low priority or a high priority.

DESCRIPTION OF THE DRAWINGS

FIG. 7 illustrates an example of an interrupt controller register map in accordance with the invention;

FIG. 8 illustrates an example of a preferred embodiment of the bit positions in the registers shown in FIG. 7; and FIGS. 9A–9C illustrate the register maps for the multiprocessor system shown in FIG. 1.

DETAILED DESCRIPTION OF A PREFERRED EMBODIMENT

The invention is particularly applicable to a dual processor portable digital music system and it is in this context that the invention will be described. It will be appreciated, however, that the multiprocessor interrupt handling system and method in accordance with the invention has greater utility and is applicable to any system that has two or more processors. Now, a preferred embodiment of a multiple processor system that is a portable digital music system will be described to provide context for the invention.

Figure 1:
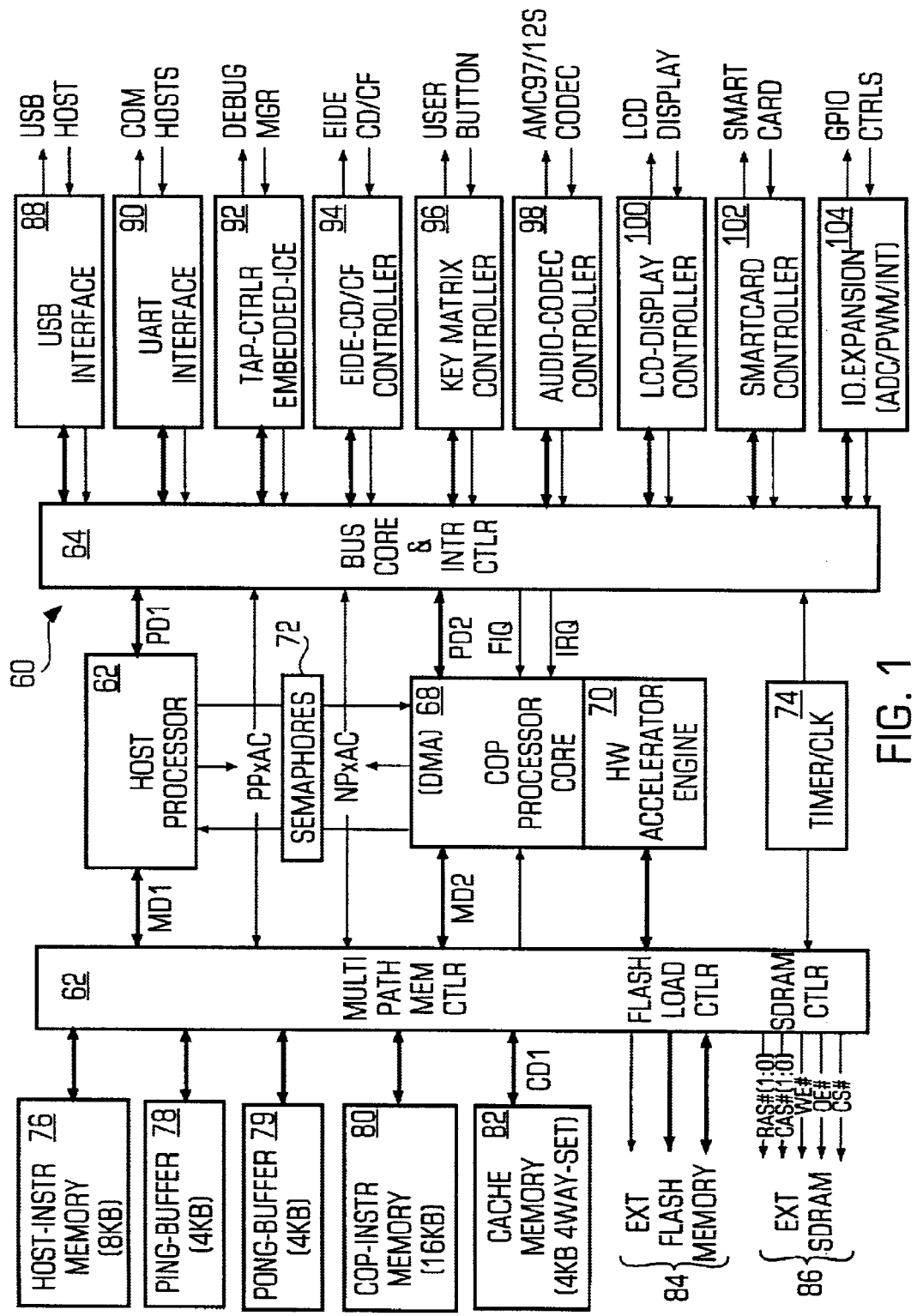
FIG. 1 is a block diagram illustrating a preferred embodiment of a multiprocessor system that may include a multiprocessor interrupt handling system in accordance with the invention.

FIG. 1 is a diagram illustrating a preferred embodiment of a portable electronic device 60, such as a portable digital music system, that may include the interrupt handling system in accordance with the invention. The system may include a cross bar multipath memory controller 62 and a cross bar multipath peripheral controller 64 which are described in more detail in copending patent application Ser. No. 09/847,991 filed on May 2, 2001 and entitled "Cross Bar Multipath Resource Controller System and Method" which is owned by the same assignee as the present invention and which is incorporated herein by reference. The crossbar multipath peripheral controller 64 may include the interrupt controller that control the operation of the interrupt handling system as described below.

As shown, the multiple processor system 60 may include a host processor 66 which may preferably be a reduced instruction set (RISC) ARM core made by ARM Inc and a coprocessor core 68 that operate in a cooperative manner to complete tasks as described above. In the preferred embodiment, there may also be a hardware accelerator engine 70 as shown. A software DMA engine 71 in this preferred embodiment may be executed by the coprocessor core 68. The software DMA engine is described in more detail in copending patent application Ser. No. 09/847,981 filed on May 2, 2001 and entitled "Software Direct Memory Access Engine for Multiple Processor Systems" which is owned by the same assignee as the present invention and which is incorporated herein by reference.

In more detail, the host processor, the coprocessor and the hardware accelerator engine are all connected to the multipath memory controller 62 and the multipath peripheral controller 64 as shown which permit the host processor and the coprocessor to access each shared resource using its own bus. To control access to the shared resources connected to the multipath memory controller and the multipath peripheral controller, the system 60 may include a semaphore unit 72 which permits the two processors 66, 68 to communicate with each other and control the access to the shared resources. The details of the semaphore unit is described in more detail in copending U.S. patent application Ser. No. 09/847,976 filed on May 2, 2001 titled "Multiprocessor Communications System and Method", owned by the same assignee as the present invention and incorporated herein by reference. The semaphore unit permits the processors to negotiate for the access to the shared resources as described above, but then, due to the multipath controllers 62, 64, permits the processors to access the resources over its own bus that is part of the controllers. To control the timing of the controllers 62, 64, a timer/clock 74 is connected to each controller 62, 64.

Both the memory controller 62 and the peripheral controller 64 are then in turn connected to one or more resources that are shared by the processors. For example, the memory controller 62 in this preferred embodiment is connected to a host instruction memory 76 that is typically accessed by the host processor 66, a ping buffer 78 that may be accessed by each processor as needed, a pong buffer 79 that may be accessed by each processor as needed and a coprocessor instruction memory 80 which is typically accessed by the coprocessor 68. Due to a priority scheme and the cross bar architecture, the host processor may always have priority access to its instruction memory 76 and the coprocessor may always have priority access to its instruction memory 80 since the two processors each have separate buses connected to each resource. The memory controller 62 may also be connected to a cache memory 82, which is a well known 4-way4 kB set associative cache in the preferred embodiment, a flash memory interface 84 for connecting to an external flash memory and an external synchronous dynamic random access memory (SDRAM) interface 86 with the various necessary signals, such as RAS, CAS, WE, OE and CS, to interface to a typical well known SDRAM.

The peripheral multipath controller, which operates in a similar manner to the memory controller in that each processor may access different shared resources simultaneously, may have one or more peripherals connected to it. In the preferred embodiment, the peripheral controller may be connected to a universal serial bus (USB) interface 88 that in turn connects to a USB device or host, a universal asynchronous receiver/transmitter (UART) interface 90 that in turn connects to communication port (COM) hosts, a TAP/embedded ICE controller 92, an EIDE-CD/CF controller 94 to interface to hard disk drives or CD drives, a key matrix controller 96 that connects to a user input keyboard, an audio-codec controller 98 that connects to an audio coder/decoder (codec), an liquid crystal display (LCD) display controller 100 that connects to a LCD display, a smartcard controller 102 for connecting to a well known smart card and an input/output (I/O) expansion port 104 that connects to one or more different input/output devices. As with the memory controller, the peripheral controller provides access for each processor to each shared resource. Now, the registers associated with the processors will be briefly described to better understand the interrupt controller in accordance with the invention.

Figure 2:
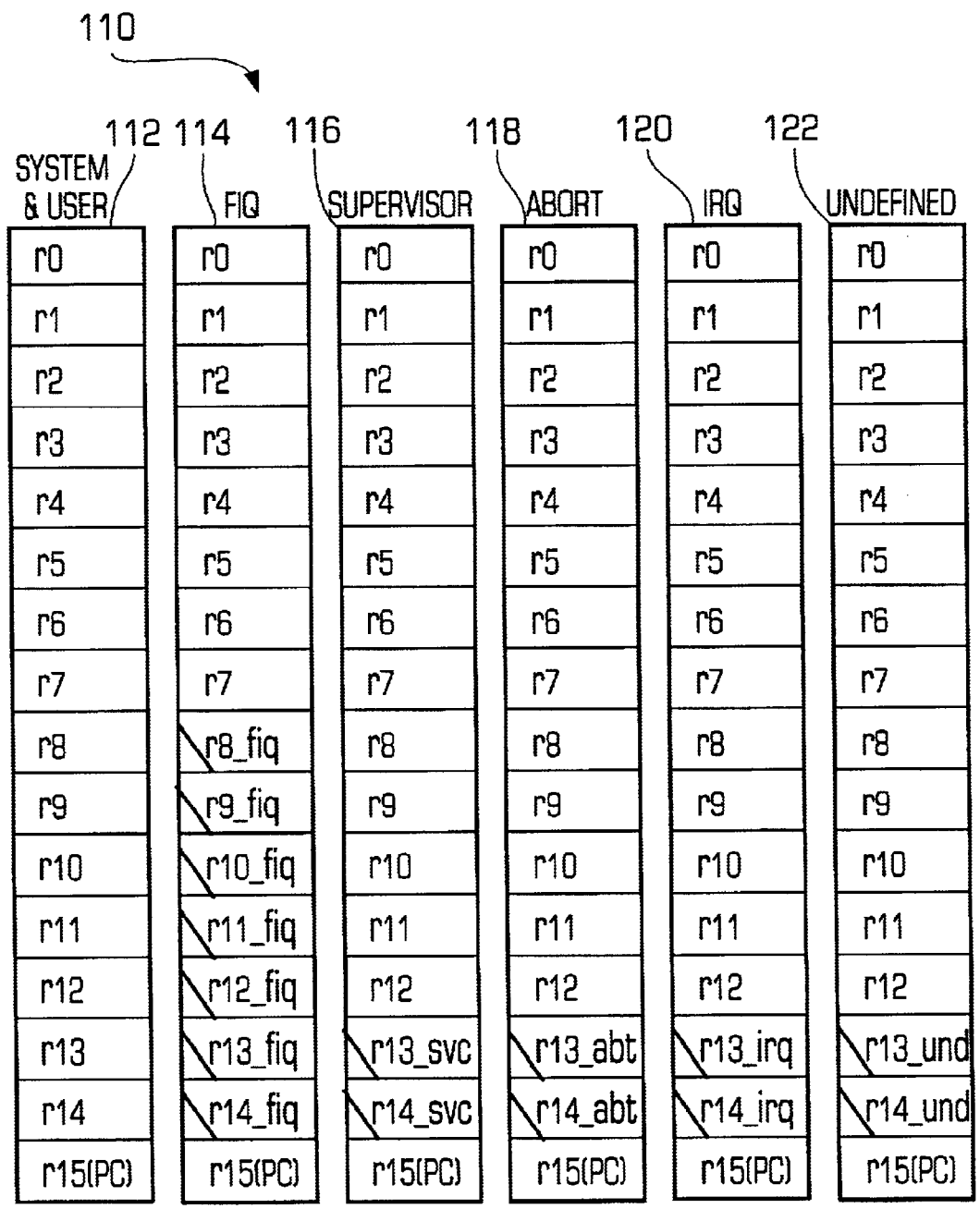
FIG. 2 is a diagram illustrating the registers associated with the processor shown in FIG. 1 which includes a fast interrupt (FIQ) mode and a normal interrupt (IRQ) mode.

FIG. 2 is a diagram illustrating a register map 110 associated with the processor shown in FIG. 1 which includes an fast interrupt (FIQ) mode and a normal interrupt (IRQ) mode. In particular, the register is shown in a system and user mode 112, a fast interrupt (FIQ) mode 114, a supervisor mode 116, an abort mode 118, an interrupt mode (IRQ) 120 and an undefined mode 122. The diagram illustrates the registers (r8–r14) that may be used for the fast interrupt signals and the registers (r13–r14) that may be used for the normal interrupt signals. In accordance with the invention, there may be the two different interrupt signals wherein the two different interrupt signals may have different priorities. In more detail, the IRQ signals may be used for typical interrupt signals while the FIQ signals may be used for time critical or short tasks such as, for example, universal serial bus (USB) bulk transfer requests. As described below, the IRQ and FIQ signals may be routed to each processor or to both processors (when the processors are sharing the tasks associated with the interrupt handling routine) by the interrupt controller that is described below. Now, more details of the cross bar bus that may include the interrupt controller in accordance with the invention will be described.

Figure 3:
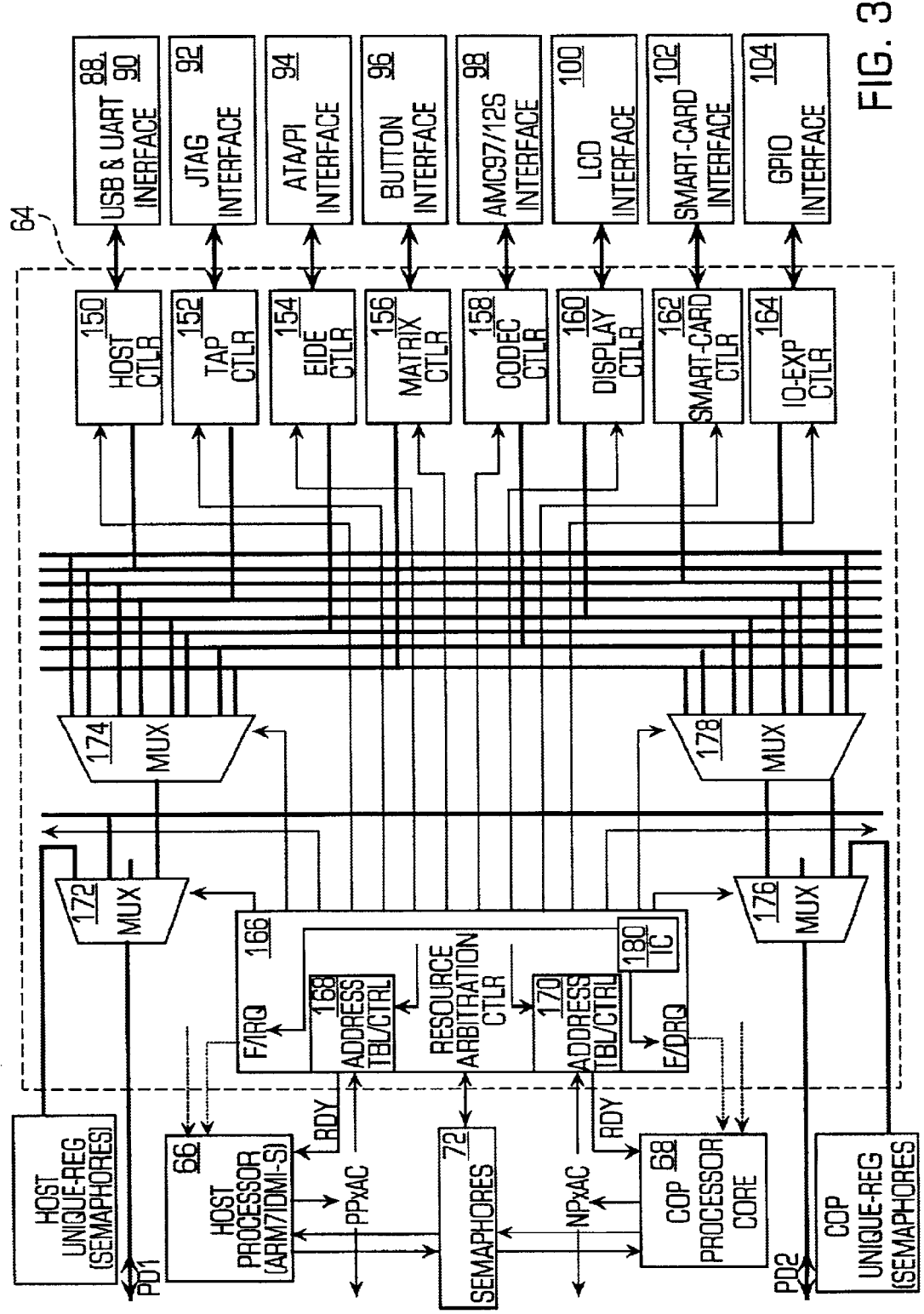
FIG. 3 is a diagram illustrating a preferred embodiment of a cross-bar bus that may include an interrupt controller in accordance with the invention.

FIG. 3 is a diagram illustrating a preferred embodiment of a cross-bar bus controller 64 that may include an interrupt controller in accordance with the invention. In this diagram, other elements of the system shown in FIG. 1 are shown as well, such as the host processor 66, the coprocessor 68, the semaphore unit 72 and the one or more peripheral interfaces 88–104 that interface to the one or more peripherals. The multipath peripheral controller 64 may include one or more controllers for the different peripherals such as a host controller 150, a TAP controller 152, a EIDE controller 154, a matrix controller 156, a codec controller 158, a display controller 160, a smart card controller 162 and an IO expansion controller 164 as shown. These controllers are controlled by a resource arbitration controller 166 that control the access of the processors to these shared peripheral resources similar to the access control of the memory resources.

The resource arbitration controller 166, that may be a microcontroller executing one or more pieces of code or microcode to send arbitration commands to the peripherals in a preferred embodiment, may include a first and second address controller 168, 170 that communicate with the address controllers of the resource arbitration controller for the multipath memory controller. As with the memory controller, to select a signal from a peripheral to be provided to each processor, the peripheral controller 64 may include a first multiplexer (MUX) 172, a second MUX 174, a third MUX 176 and a fourth MUX 178. Each MUX is controlled in order to select a signal from one or more signals and output the selected signal as is well known. In this embodiment, the first MUX 172 outputs a signal onto a peripheral data bus (PD1) indirectly to the host processor and the third MUX 176 outputs a signal on another peripheral data bus (PD2) indirectly to the coprocessor. The MUXes indirectly output the signal since those signals are actually fed into MUX 128 and MUX 132 as shown in FIG. 7 and then fed into each processor over the memory data buses (MD1 and MD2 as shown in FIG. 7) assuming the appropriate control signals to the MUXes 128, 132 are provided. Thus, the signal for the particular peripheral is selected by the MUXes 172, 174 and 176, 178, but it is communicated to the processors over the memory data buses due to the MUXes 128, 130.

As with the memory controller, the MUXes 172, 174, 176, 178 are controlled to select a bus containing a signal from a particular peripheral to route that signal to a particular processor. As with the memory controller, the multipath architecture permits each processor to simultaneously access a shared peripheral resources as long as both processors do not need the same shared resource. The operation of the peripheral controller and bus is similar to the memory controller as described in the above-identified co-pending patent application and therefore will not be described herein.

In accordance with the invention, the peripheral controller 64 permits the interrupt signals generated by the one or more peripheral devices connected to the one or more peripheral interfaces 88–104 to be routed to the one or more peripheral controllers 150–164. The one or more peripheral controllers 150–164 may then pass the interrupt signal for the particular peripheral on to the resource arbitration controller 166. The resource arbitration controller may include an interrupt controller (IC) 180 as described in more detail below with reference to FIGS. 4–6. The interrupt controller may be one or more hardware circuits that may be controlled by one or more software instructions and may control the routing of the interrupt signals from the peripherals to the dual processors 66, 68. As shown, the interrupt controller may generate an interrupt signal (IRQ) and/or a fast interrupt signal (FIQ) and output that signal to each processor 66, 68. Due to the structure of the peripheral bus shown, each peripheral may send an interrupt signal to the interrupt controller 180 at any time since each peripheral controller 150–164 has an independent bus to the interrupt controller. Now, the logical structure and operation of the interrupt controller will be described.

Figure 4:
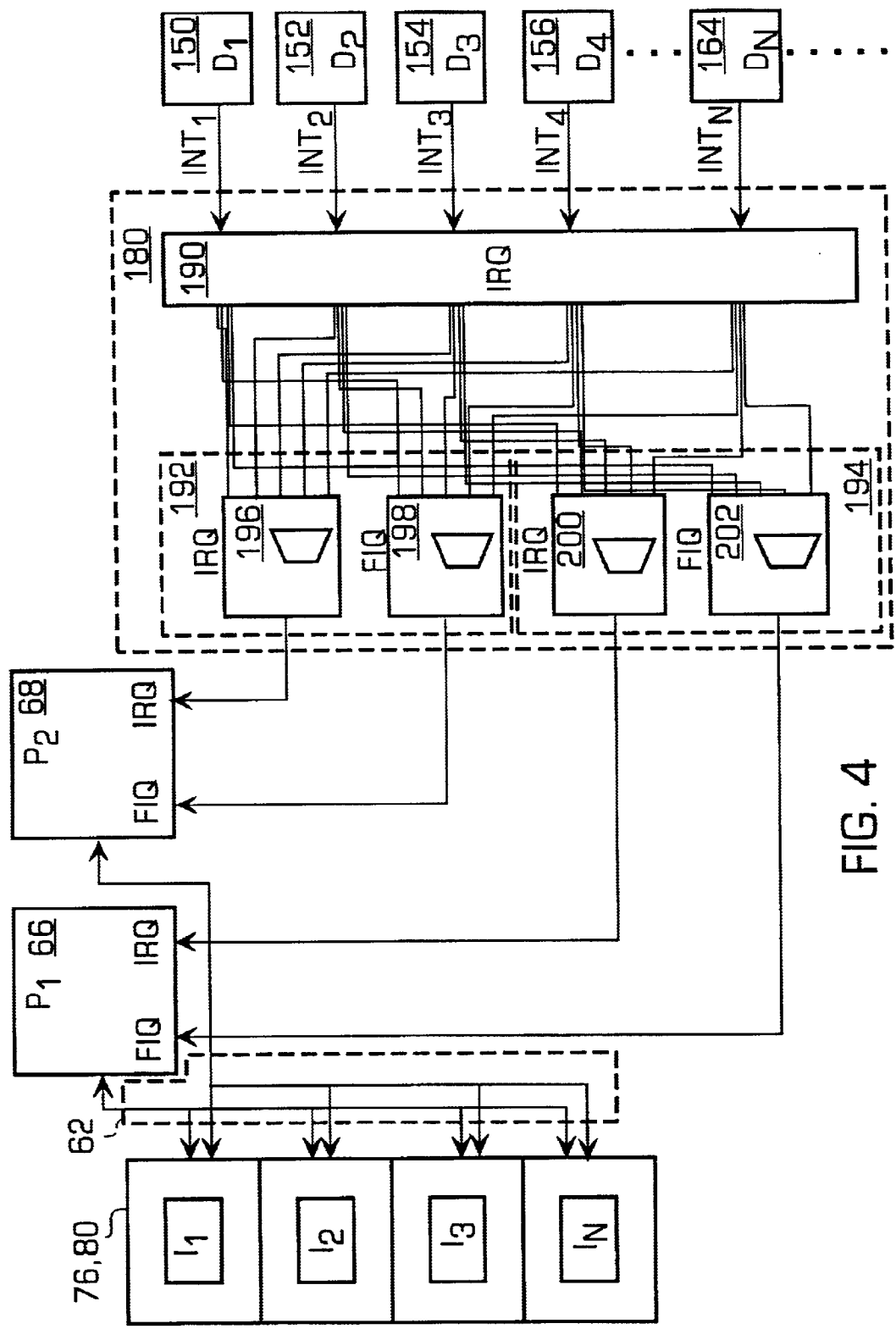
FIG. 4 is a diagram illustrating the interconnection between the multiple processors, the interrupt controller, the hardware peripheral devices and the one or more interrupt service routines in accordance with the invention.

FIG. 4 is a diagram illustrating the interconnection between the multiple processors 66, 68, the interrupt controller 180, the hardware peripheral device controllers 150–164 and the one or more interrupt service routines in accordance with the invention. In particular, the two processors 66, 68 are shown connected to the cross bar multipath memory controller and bus 62 that permits each processor to independently access the memories 76, 80 as described above. As shown, the memories may store one or more interrupt service routines ($I_1, I_2, I_3, \ldots I_N$) that may each be independently accessed by each processor. Thus, for example, the tasks associated with the servicing of an interrupt from a particular peripheral device controller may be split up between the two processors 66, 68 since each processor may independently access the memories.

As shown, the interrupt controller 180 may generate a normal interrupt signal (IRQ) and a fast, higher priority interrupt signal (FIQ) that are output to each processor. In more detail, the interrupt controller 180 may include an IRQ register 190 that receives the interrupt signals ($INT_1$, $INT_2$, ... $INT_N$) from the peripheral device controllers. The interrupt controller 180 may further include a first set of steering registers 192 and a second set of steering registers 194 wherein the first set of steering registers 192 output interrupt signals to the second processor 68 and the second set of steering registers 194 output interrupt signals to the first processor 66. The first set of steering registers 192 may further include an IRQ steering register 196 that outputs an IRQ signal to the second processor and a FIQ steering register 198 that outputs a FIQ signal to the second processor. Similarly, the second set of steering registers 194 may further include an IRQ steering register 200 that outputs an IRQ signal to the first processor and a FIQ steering register 202 that outputs a FIQ signal to the first processor.

As shown, each interrupt signal (e.g., $INT_1$) from each peripheral device controller is electrically connected to each of the registers 196–202. Thus, based on commands provided to the interrupt controller by embedded microcode or other software, the interrupt controller is able to route the interrupt signal from any peripheral device to either processor and may generate either an IRQ signal or an FIQ signal for each interrupt. In this manner, the interrupt controller in accordance with the invention is dynamically programmable so that it can change the routing of the interrupt signals and the priority of the interrupt signals at any time. For example, the operating system may determine that the first processor is too busy to handle any interrupts and may therefore program the interrupt controller so that all future interrupt requests (until changed) can be automatically directed to the second processor. An another example, for a particular interrupt, the tasks of the interrupt routine may be split up between the two processors. In a preferred embodiment, the operating system may, if the first processor is too busy to handle interrupts, write a bit into the IRQ/FIQ registers so that the second processor will jump to the appropriate interrupt handling routine and handle the interrupt request.

In operation, a peripheral device, through its controller, may generate an interrupt request. The interrupt request may be received by the interrupt controller 180 that, using the registers that are dynamically programmed, may route the interrupt signal to the second processor and generate a lower priority IRQ signal that is fed into the second processor which is in turn directed to a particular interrupt handling routine stored in the memories. At a different time, the same peripheral may generate another interrupt request and it may be serviced by the first processor as a high priority interrupt since the dynamically programmable routing and priority determination of the interrupt controller has changed. Now, an example of a preferred hardware circuit implementation of the interrupt controller in accordance with the invention will be described.

Figure 5:
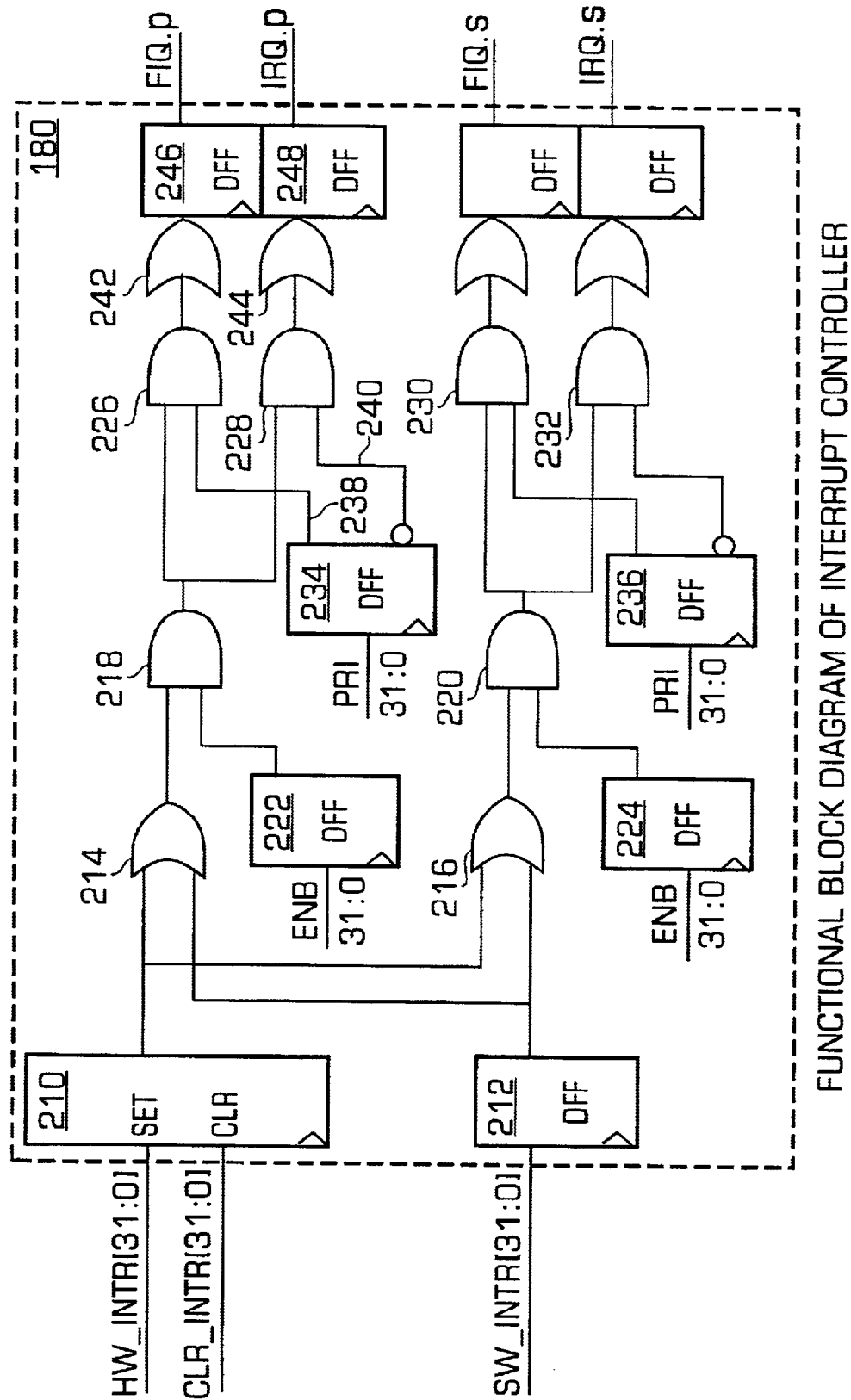
FIG. 5 is a diagram illustrating more details of a preferred embodiment of the interrupt controller in accordance with the invention.

FIG. 5 is a diagram illustrating more details of a preferred embodiment of the interrupt controller 180 in accordance with the invention that routes the interrupt signals to the first and/or second processor and generates a lower priority IRQ signal or a higher priority FIQ signal. In more detail, the interrupt controller 180 is based on the dual priority interrupt vectors (FIQ and IRQ). In general, each of the 32 hardwired interrupt sources (the peripheral devices) are ORed with 32 bit Soft-Interrupt register bits to create common interrupt sources for both processors. Each processor may then enable the interrupt sources for either a FIQ or IRQ interrupt priority. Note that a single interrupt source can trigger interrupts for either or both processors as described above.

Also note also that each processor may interrupt the other processor by setting the SW_INTR register bits for the other processor interrupt. The interrupt status should be determined by reading the interrupt source register and masking off the disabled interrupt bits. The order of interrupt service priority is determined by the software implementation of the decode and ISR dispatch handler. Note that the FIQ and IRQ signals are synchronous signals to each processor so the HW_INTR sources must have been synchronized to the SYS_CLK prior to entering the Interrupt Controller.

In more detail, the interrupt controller may include a well known Set-Reset (SR) flip-flop (FF) 210 wherein the 32 bits of hardware interrupt signals (HW_INTR) are fed into the set input of the FF and 32 bits of interrupt clear signals (CLR_INTR) are fed into the clear input of the FF. Thus, the interrupt bit entering the interrupt controller is set into the FF 210 and output during the next clock cycle as is well known. The value of the bit currently in the FF 210 may be reset by asserting the CLR_INTR signal that clears the FF 210. The flip-flops are used throughout the interrupt controller to maintain the synchronicity of the interrupt signals at all times.

The interrupt controller may further include a well known D-type FF 212 wherein the software interrupt bits (32 bits in this example) are fed into the D input of the FF 212. As with the FF 210, the D FF 212 outputs a bit each clock cycle. Thus, when the next clock cycle occurs, the RS FF 210 outputs its interrupt bit from the hardware and the D FF 212 outputs its software interrupt bits.

The outputs of the two FFs are fed into a first and second well known logical OR gate 214, 216 that output a high bit if either of the inputs are high (e.g., if there is a hardware interrupt bit or a software interrupt bit or if there is both a hardware interrupt bit and a software interrupt bit. The outputs of the OR gates 214, 216 are fed into one input of well known logical AND gates 218, 220. The other input into the AND gates 218, 220 is a signal that is output from a first D FF 222 and a second D FF 224, respectively. Each D FF 222, 224 is fed an interrupt enable signal (ENB) that enables the interrupt signals for the particular processor. In particular, the D FF 222 enables/disables the interrupt signal for the first processor while the other D FF 224 enables/disables the interrupt signals for the second processor. Thus, the interrupt signals for the first and second processor may be independently enabled or disabled. In operation, if the interrupts for the first processor are enabled, then the D FF 222 may output a high signal upon a clock pulse that is fed into the AND gate 218 while if the interrupts for the second processor are enabled, then the D FF 224 may output a high signal upon a clock pulse that is fed into the AND gate 220. If the interrupts are not enabled for either processor, the AND gate 218, 220 associated with that processor will output a low signal regardless of the interrupt signals so that no interrupt signal is passed onto the particular processor. Thus, the enable signals permit the system to effectively route the interrupt signals between the processors.

Assuming that the interrupts are enabled for both processors, the respective AND gates 218, 220 output a high signal corresponding to the interrupt signal. The output is fed into a set of first and second AND gates 226, 228, 230, 232 for each processor as shown. The other input for the AND gates 226–232 is a signal output from a D FF 234, 236, respectively. The operation of D FF 234 will be described, but it should be understood that the operation of D FF 236 is identical. The D FF 234 is fed a priority signal (PRI) wherein the interrupt signal may be routed to and output as a lower priority IRQ signal or as a higher priority FIQ signal based on the PRI signals. Thus, the PRI signals permit the system to assign a priority to each interrupt signal. The D FF 234 may output a signal 238 and its complement 240 as shown so that one signal is high while the other signal is low. The signal 238 is fed into the first AND gate 226 while the complement signal 240 is fed into the second AND gate 228 so that, assuming that the interrupt signal is enabled for the first processor, the signals 238, 240 effectively determine whether the interrupt signal is output as an IRQ signal or an FIQ signal based on the PRI signal. The output from the AND gate 226 or 228 selected by the PRI signal is output into an OR gate 242, 244 that act as a buffer and fed into a first and second D FF 246, 248 as shown. The output of the D FFs 246, 248 is the IRQ and FIQ signals that are routed to the first processor. As similar set of signals and operation occurs for the second processor as shown, but not described.

Thus, in operation, the interrupt controller 180 is dynamically programmable so that 1) an interrupt may be enabled or disabled independently for each processor and 2) the priority of an interrupt may be dynamically assigned to each interrupt signal. Thus, the interrupt controller has the ability to route the interrupt signals between the processors as well as assign the priority for each interrupt signal entering the interrupt controller. In addition, using the software interrupt bits, one processor may interrupt the other processor and cause it to jump to an interrupt handling routine. Now, more details of the interrupt controller will be described.

Figure 6:
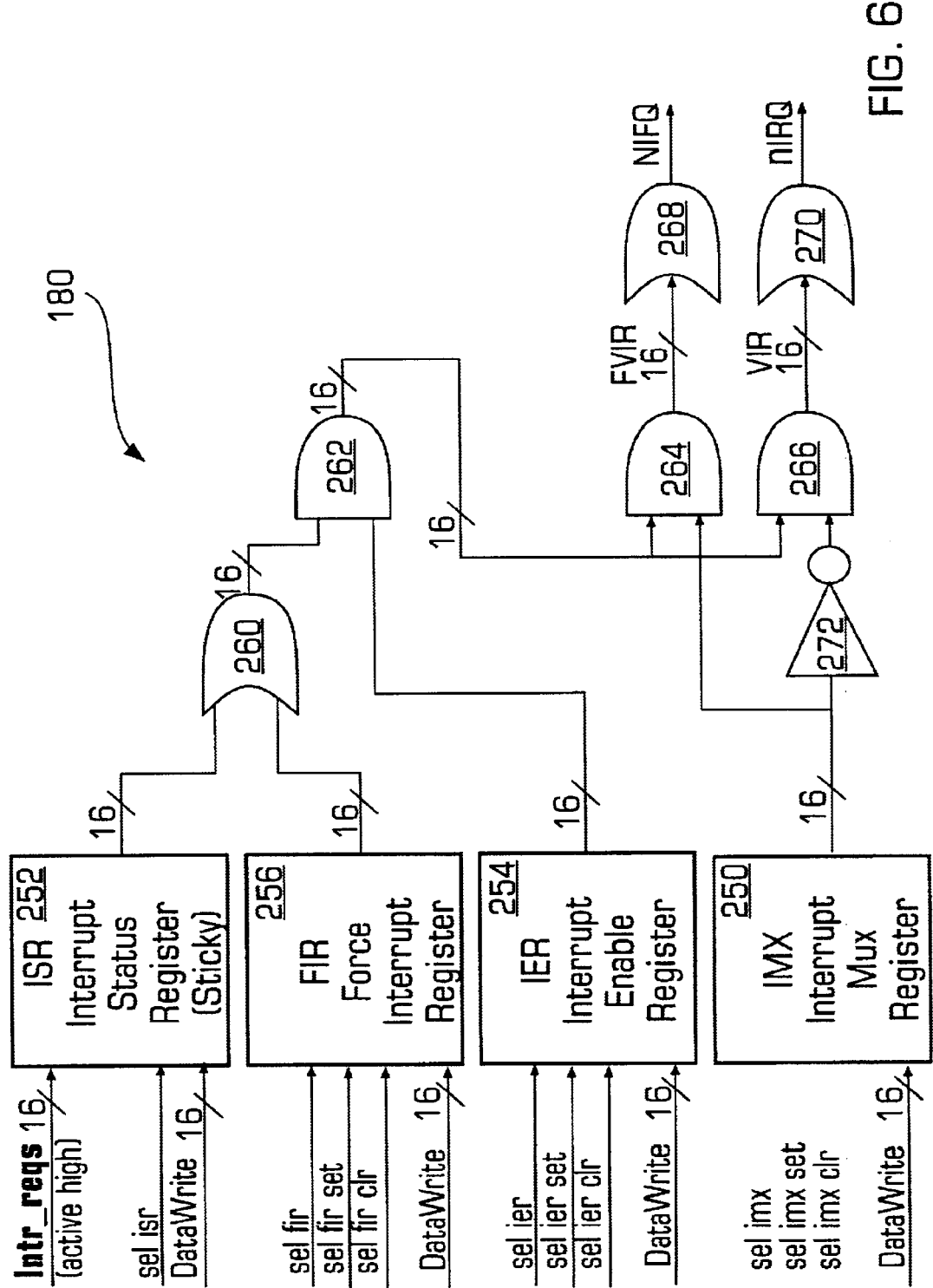
FIG. 6 is a diagram illustrating more details of a preferred embodiment of the interrupt controller in accordance with the invention and the interrupt registers in accordance with the invention.

FIG. 6 is a diagram illustrating more details of a preferred embodiment of the interrupt controller 180 in accordance with the invention and the interrupt registers in accordance with the invention. As described above, there may be two types of hardware interrupts, nIRQ and nFIQ (IRQ and FIQ in FIG. 5). The nIRQ signal is the normal active-low interrupt signal while the nFIQ signal is a fast interrupt signal which is used to manage time critical or short tasks such as USB bulk transfer requests. Any of the interrupt requests can be routed to either the nIRQ or nFIQ, based on the select bit set in an Interrupt Mux Register 250. In this preferred embodiment, the interrupt controller has 10 writable registers and 2 read-only registers.

In more detail, the writable registers include an Interrupt Status Register (ISR) 252, an Interrupt Enable Register (IER) 254, a Force Interrupt Register (FIR) 256, and the Interrupt Mux Register (IMX) 250. One or more bits may be set in these one or more registers in order to control the operation of the interrupt controller. In particular, when a '1' bit is set in the proper bit position in the IER 254 (using the sel_ier, sel_ier_set, sel_ier_clr and DataWrite signals), that particular source is capable of interrupting the processor. The ISR register 252 (using the Intr_reqs, sel_isr and DataWrite signals) allows the processor to view the state of the pending interrupt requests, whether enabled or disabled. The FIR register 256 (using the sel_fir, sel_fir_set, sel_fir_clr and DataWrite signals) allows the software to selectively force the execution of a specific interrupt service routine as needed.

A read-only VIR register (not shown) allows the processor to determine the actual source of the interrupt request(s) that has caused the processor to enter the nIRQ interrupt service routine. The VIR signal is the logical OR of the FIR and ISR, ANDed with the IER, ANDed with the NOT of the IMX as will be described. The read-only FVIR allows the processor to determine the actual source of the interrupt request(s) that has caused the processor to enter the nFIQ interrupt service routine. The FVIR is the logical OR of the FIR and ISR, ANDed with the IER, ANDed with the IMX as will be described. The IER, FIR and IMX also have corresponding set and clear registers, which allow bits to be turned on or off in a single atomic operation as will be described with reference to FIGS. 7–9.

In more detail, the interrupt controller logic may include a logical OR gate 260 that logically ORs the bits of the ISR signal and the bits of the FIR signal. Thus, if either the ISR signals or the FIR signals are high, the OR gate 260 will output a high signal. The output from the OR gate is fed into an input of an enable AND gate 262 that is effectively programmable to enable or disable the interrupt signals. The other input of the AND gate is the bits from the IER signal (the interrupt enable signals). Thus, if the interrupts are disabled for some reason, the output of the AND gate is low. If there is a signal from the FIR or the ISR and the interrupts are enabled, then the AND gate 262 outputs high bits corresponding to the bits from the ISR and FIR registers. The output of the AND gate 262 is fed into the inputs of a first MUX AND gate 264 and a second MUX AND gate 266 that effectively determines if an interrupt should be output as a lower priority IRQ signal or a higher priority FIQ signal. The selection of the priority of the interrupt signal is controlled by the IMX register 250. The output from the IMX register is fed into the AND gate while it is fed through an inverter 272 and then into the input of the second AND gate 266. In this manner, one AND gate generates a high output while the other AND gate generates a low signal so that either the IRQ signal is output or the FIQ signal is output. The output of the AND gates 264, 266 is a FVIR signal and a VIR signal, respectively whose function is described above. Those signals are then output through OR gates 268, 272 that act as buffers and output the nFIQ and the nIRQ signals as shown. Now, the registers and the register bits that control the interrupt controller will be described in more detail.

FIG. 7 illustrates an example of a preferred embodiment of an interrupt controller register map 280 in accordance with the invention. In this register map, the offset from the zero bit position, the name of the register and a description of the register is shown. The map also lists the set and clear registers that are used to set and clear the bits in the other registers. For example, the FIR-set register operates in such a way that each bit (a bit for each interrupt signal from each interrupt source) written as a "1" will set the corresponding bit in the FIR. As described above, the VIR and FVIR registers 282, 284 permit the processors to determine the source of a particular interrupt based on the bit positions of the interrupt signal as will now be described.

FIG. 8 illustrates an example of a preferred embodiment of the bit positions in the registers shown in FIG. 7. In particular, for each register in FIG. 7, there may be a total of 32 5 bits (bit 0–bit 31) that may correspond to a particular interrupt source. Some of the bits (bit 14–bit 31) are not assigned and may be used for later additional interrupts. The assigned bits correspond to interrupts from the USB port/controller, from the universal asynchronous receive/transmit controller (UART A and UART B), from an external source, from the fast USB controller, from the keyboard, from the EIDE controllers (EIDE 1, EIDE 2), from the timers 10 (Timer 1, Timer 2), from the USB reset, from the audio codec (AC97) and from two other timers (Timer 1 and Timer 2). In this manner, using the VIR and FVIR registers and the above known bit positions, the processors can always determine the source of an interrupt request from the interrupt controller. FIGS. 9A–9C illustrate an example of the actual register maps for the multiprocessor system shown in FIG. 1.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A computer system having an interrupt handling apparatus, the computer system comprising:
   one or more processors;
   one or more hardware devices that are capable of interrupting the one or more processors using an interrupt signal;
   an interrupt controller that is capable of handling the interrupts from the one or more hardware devices and capable of independently generating a low priority interrupt signal and a high priority interrupt signal for each processor;
   the interrupt controller further comprising an enable device that is capable of enabling the interrupt signal independently for each processor and a priority device that is capable of assigning a priority to each interrupt signal destined for any processor wherein a particular interrupt signal is capable of being routed to either processor and is capable of being assigned a low priority or a high priority.

2. The system of claim 1, wherein the enable device further comprises a first processor enable device that is capable of enabling the interrupt signals for the first processor and a second processor enable device that is capable of enabling the interrupt signals for the second processor.

3. The system of claim 1, wherein the priority device further comprises a first processor priority device that is capable of assigning a priority to the interrupt signals for the first processor and a second processor priority device that is capable of assigning a priority to the interrupt signals for the second processor.

4. The system of claim 1, wherein the interrupt controller further comprises a device for multiplexing the one or more hardware interrupt signals with one or more software interrupt signals so that the processors are capable of being interrupted by hardware devices and software.

5. The system of claim 2, wherein each enable device comprises one or more flip-flips connected together with one or more logical gates.

6. The system of claim 3, wherein each priority device comprises one or more flip-flips connected together with one or more logical gates.

7. The system of claim 4, wherein the software interrupt signals comprise a software interrupt generated by one processor to interrupt another processor.

8. The system of claim 5, wherein each enable device further comprises a register containing an interrupt enable signal that is fed into the logical gates in order to enable the interrupt signals of the particular processor.

9. The system of claim 6, wherein each priority device further comprises a register containing an interrupt priority signal that is fed into the logical gates in order to determine the priority for the interrupt signals of the particular processor.

10. The system of claim 9, wherein each priority device selects between a low priority signal and a high priority signal.

11. The system of claim 10, wherein the high priority signal comprises an FIQ signal and the low priority signal comprises an IRQ signal.

12. A computer system having an interrupt handling apparatus, the computer system comprising:
   one or more processors;
   one or more hardware devices that are capable of interrupting the one or more processors using an interrupt signal;
   an interrupt controller that is capable of handling the interrupts from the one or more hardware devices and capable of independently generating a low priority interrupt signal and a high priority interrupt signal for each processor,
   the interrupt controller further comprising means for independently enabling the interrupt signal for each processor and means for independently assigning a priority to each interrupt signal destined for any processor wherein a particular interrupt signal is capable of being routed to either processor and is capable of being assigned a low priority or a high priority.

13. The system of claim 12, wherein the enable means further comprises a first processor enable device that is capable of enabling the interrupt signals for the first processor and a second processor enable device that is capable of enabling the interrupt signals for the second processor.

14. The system of claim 12, wherein the priority means further comprises a first processor priority device that is capable of assigning a priority to the interrupt signals for the first processor and a second processor priority device that is capable of assigning a priority to the interrupt signals for the second processor.

15. The system of claim 12, wherein the interrupt controller further comprises a device for multiplexing the one or more hardware interrupt signals with one or more software interrupt signals so that the processors are capable of being interrupted by hardware devices and software.

16. The system of claim 13, wherein each enable device comprises one or more flip-flips connected together with one or more logical gates.

17. The system of claim 14, wherein each priority device comprises one or more flip-flips connected together with one or more logical gates.

18. The system of claim 15, wherein the software interrupt signals comprise a software interrupt generated by one processor to interrupt another processor.

19. The system of claim 16, wherein each enable device further comprises a register containing an interrupt enable signal that is fed into the logical gates in order to enable the interrupt signals of the particular processor.

20. The system of claim 17, wherein each priority device further comprises a register containing an interrupt priority signal that is fed into the logical gates in order to determine the priority for the interrupt signals of the particular processor.

21. The system of claim 20, wherein each priority device selects between a low priority signal and a high priority signal.

22. The system of claim 21, wherein the high priority signal comprises an FIQ signal and the low priority signal comprises an IRQ signal.

23. A method for interrupt handling in a multiple processor system, the method comprising:
   assigning the interrupt signal to one of the multiple processors based on availability of each processor, wherein assigning the processor further comprises reading a register to determine the assignment of the interrupt signal to a particular processor;
   assigning a priority level to the interrupt signal wherein the priority is selected from one or more different priorities; and routing the interrupt signal with the assigned priority level to the assigned processor.

24. The method of claim 23, wherein the register reading further comprises reading an enable register associated with each processor to determine the availability of each processor to handle the interrupt signal.

25. The method of claim 23, wherein the routing further comprises splitting up the servicing of the interrupt signal between the processors.

26. The method of claim 23, wherein the processor assigning further comprises dynamically assigning the processor to handle a particular interrupt signal.

27. The method of claim 23, wherein assigning the priority further comprises reading a priority register to determine the priority of the interrupt signal.

28. The method of claim 23, wherein the priority assigning further comprises dynamically assigning the priority to the interrupt signal.

29. The method of claim 27, wherein the priority assigning further comprises assigning a low priority to the interrupt signal and assigning a high priority to the interrupt signal.

30. A method for interrupt handling in a multiple processor system, the method comprising:

assigning the interrupt signal to one of the multiple processors based on availability of each processor, wherein assigning the processor further comprises reading a register to determine the assignment of the interrupt signal to a particular processor; and assigning a priority level to the interrupt signal wherein the priority is selected from one or more different priorities.

31. The method of claim 30, wherein the register reading further comprises reading an enable register associated with each processor to determine the availability of each processor to handle the interrupt signal.

32. The method of claim 30, wherein the routing further comprises splitting up the servicing of the interrupt signal between the processors.

33. The method of claim 30, wherein the processor assigning further comprises dynamically assigning the processor to handle a particular interrupt signal.

34. The method of claim 30, wherein assigning the priority further comprises reading a priority register to determine the priority of the interrupt signal.

35. The method of claim 30, wherein the priority assigning further comprises dynamically assigning the priority to the interrupt signal.

36. The method of claim 34, wherein the priority assigning further comprises assigning a low priority to the interrupt signal and assigning a high priority to the interrupt signal.

37. A computer system, comprising:

a first processor;

a second processor;

a peripheral controller having a first bus that is capable of connecting the first processor to a set of peripheral resources and a second bus that is capable of connecting the second processor to the same set of peripheral resources wherein each peripheral in the set of peripheral resources is capable of generating an interrupt signal;

the peripheral controller further comprising an interrupt controller that is capable of handling the interrupts from the set of peripheral resources and software interrupts and capable of independently generating a low priority interrupt signal and a high priority interrupt signal for each processor from the peripheral and software interrupts, the interrupt controller further comprising a first processor enable device that is capable of enabling the interrupt signals for the first processor, a second processor enable device that is capable of enabling the interrupt signals for the second processor, a first processor priority device that is capable of assigning a priority to the interrupt signals for the first processor and a second processor priority device that is capable of assigning a priority to the interrupt signals for the second processor wherein a particular interrupt signal is capable of being routed to either processor and is capable of being assigned a low priority or a high priority.

38. A computer system, comprising:

a first processor;

a second processor;

a peripheral controller comprising first communications means that is capable of connecting the first processor to a set of peripheral resources and a second communications means that is capable of connecting the second processor to the same set of peripheral resources wherein each peripheral in the set of peripheral resources is capable of generating an interrupt signal;

the peripheral controller further comprising an interrupt controller that is capable of handling the interrupts from the set of peripheral resources and software interrupts and capable of independently generating a low priority interrupt signal and a high priority interrupt signal for each processor from the peripheral and software interrupts, the interrupt controller further comprising means for enabling the interrupt signals for the first processor, means for enabling the interrupt signals for the second processor, means for assigning a priority to the interrupt signals for the first processor and means for assigning a priority to the interrupt signals for the second processor wherein a particular interrupt signal is capable of being routed to either processor and is capable of being assigned a low priority or a high priority.

* * * * *